Sept. 3, 1940.  J. J. MacDOUGALL  2,213,675
SPEED INDICATING DEVICE
Filed Sept. 18, 1937  3 Sheets-Sheet 2
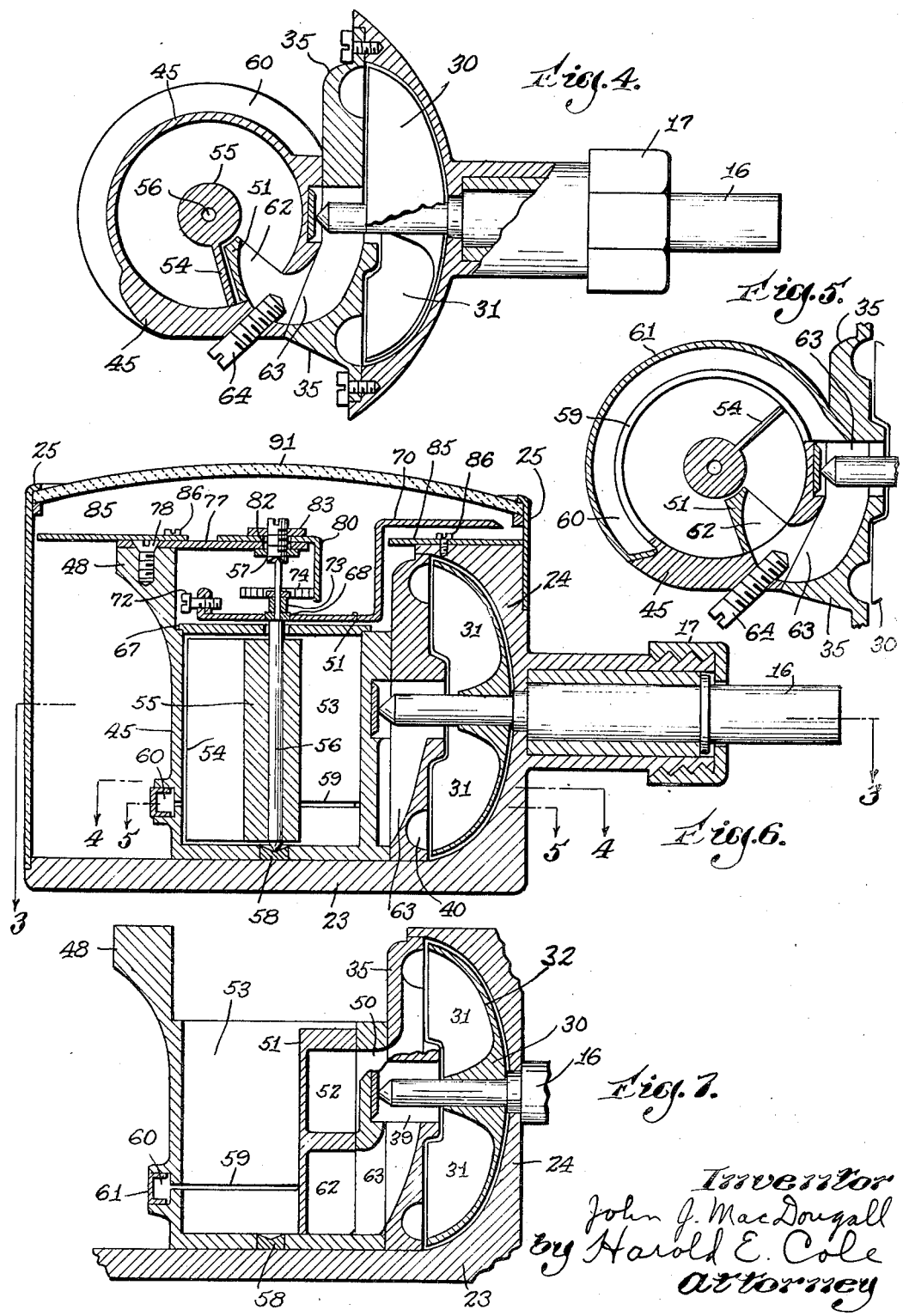

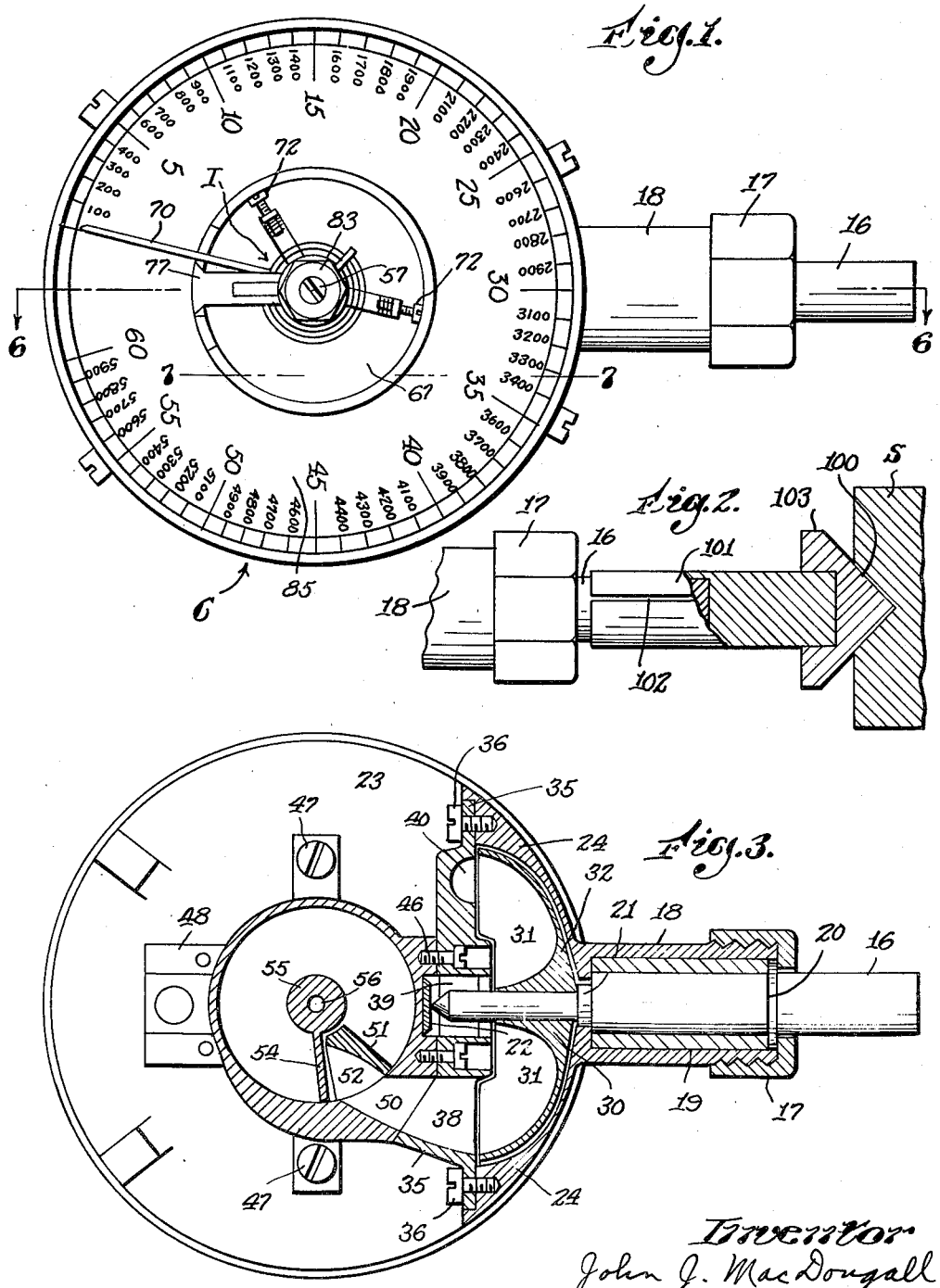

Sept. 3, 1940.   J. J. MacDOUGALL   2,213,675
SPEED INDICATING DEVICE
Filed Sept. 18, 1937   3 Sheets-Sheet 3
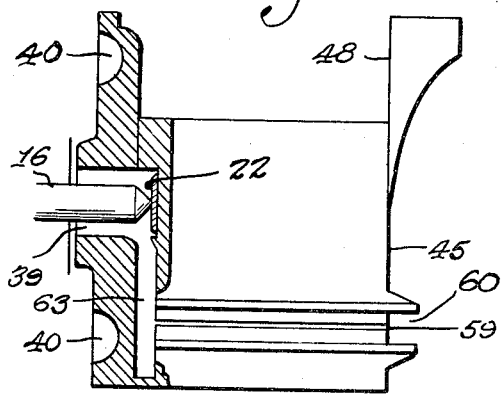
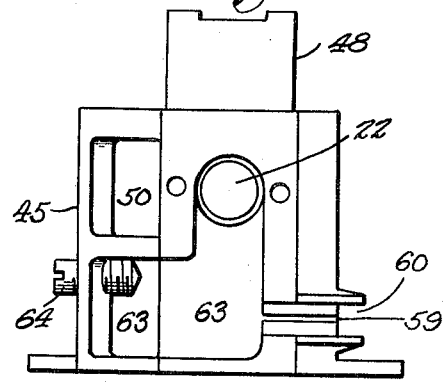
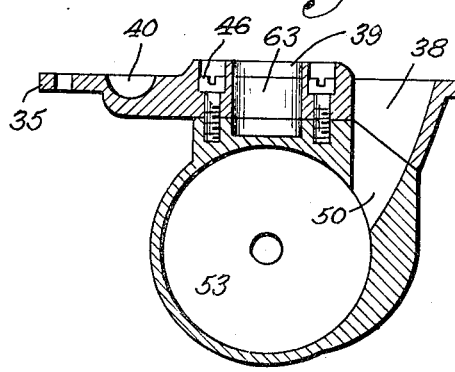
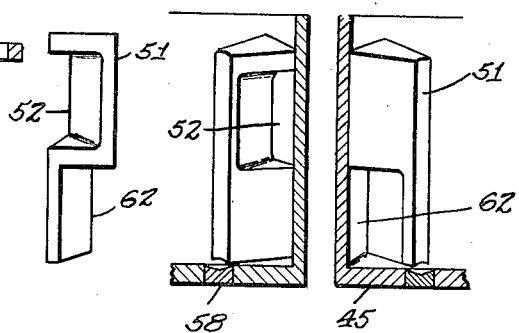
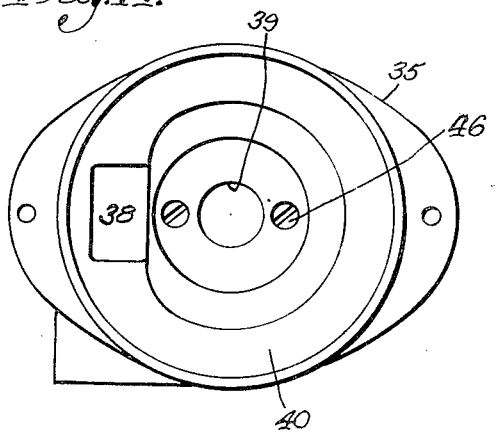
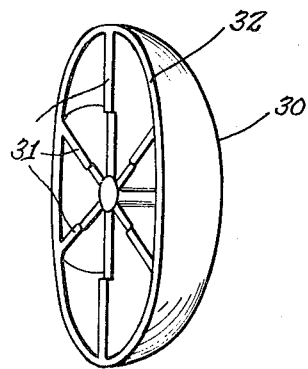
Inventor
John J. MacDougall
by Harold E. Cole
Attorney Patented Sept. 3, 1940

2,213,675

UNITED STATES PATENT OFFICE 2,213,675

SPEED INDICATING DEVICE

John J. MacDougall, Boston, Mass.

Application September 18, 1937, Serial No. 164,605

12 Claims. (Cl. 264—12)

This invention relates to speed indicating devices such as tachometers.

One object of my invention is to provide a compact device which can readily be operatively connected to the end of a shaft and almost instantly determines the speed of rotation of said shaft, being operative in whichever direction the said shaft rotates.

Another object is to provide such a device which is operated by the force or pressure of air created by the rotation of a centrifugal fan which is rotated by the shaft whose speed of rotation is being determined.

Another object is to provide such a device that is simple and inexpensive to manufacture, including the assembly of its parts, and which can readily be adjusted so that each device will be uniformly accurate.

The foregoing and other objects which will appear as the nature of the invention is better understood, may be accomplished by a construction, combination and operative arrangement of parts such as is disclosed by the drawings and specification. The nature of the invention is such as to render it susceptible to various changes and modifications, and, therefore, I am not to be limited to said disclosure; but am entitled to all such changes therefrom as fall within the scope of my claims.

In the drawings:

Figure 1 is a plan view of my complete device.

Figure 2 is a plan view, partly broken away and in section, showing my device connected to the shaft whose speed is to be determined.

Figure 3 is a sectional view taken on the line 3—3 of Figure 6.

Figure 4 is a sectional view taken on the line 4—4 of Figure 6.

Figure 5 is a sectional view taken on the line 5—5 of Figure 6; but showing the vane moved to a further forward position.

Figure 6 is a vertical sectional view taken on the line 6—6 of Figure 1.

Figure 7 is a vertical sectional view taken on the line 7—7 of Figure 1.

Figure 8 is a side elevational view, partly in section, broken away, of the housing in which the vane operates.

Figure 9 is a side elevational view of my device with the casing removed, showing the air passages in the housing in which the vane operates.

Figure 10 is a sectional view of the closure plate for the fan and the housing in which the vane operates, together, illustrating the air outlet openings from the fan.

Figure 11 is an outer end elevational view of the dividing wall for the housing.

Figure 12 is a perspective view of one side of the said dividing wall taken from the interior of the housing in which the vane operates, and Figure 13 is a similar view of the opposite side.

Figure 14 is an interior front elevational view of the closure plate for the fan.

Figure 15 is a perspective view of the fan for my device.

As illustrated, my device has a shaft 16 extending beyond the remainder of the device and adapted to be operatively connected to a shaft S or other member to thereby determine the speed of rotation of the latter. Said shaft 16 extends through a hollow extension member 18 having a screw-threaded portion at its outer end on which a nut 17 is screw-threadedly connected. There is a bearing 19 for said shaft 16 inside said hollow member 18, and at a point on said shaft near the end of said hollow member 18 there is a shoulder 20 turned thereon which I term an outer shoulder, and which will keep the shaft from being pulled out when the said nut 17 is in place because the opening at the outer end of said nut is smaller than said shoulder 20. Said shaft 16 has an inner shoulder 21. The diameter of said shaft preferably varies at different portions, for instance the outer end portion may be ¼", the said inner shoulder 21 may be $\tfrac{3}{16}$" and the inner end portion of the said shaft may be ⅛". An end bearing 22 is provided at the end of said shaft 16.

My device has a casing C having a base 23 which serves as a bottom support for my device and from which a side 24 extends upwardly unevenly. A cover member 25 fits over part of said side 24 and rests on said base 23 and a shoulder formed in side 24, having a slot at one side therein so that said cover 25 may be inserted in its place over said extension member 18.

A fan 30 having blades 31, preferably of the centrifugal type and of the form shown, is pressed onto said shaft 16 and rotates therewith, by means of which the air pressure is created that operates my device. Said fan 30 preferably has a shroud or frame portion 32 which encloses all but the front of said fan and is so formed with relation to the shape of said casing C that it operates within said casing C with a maximum of efficiency. While a fan with straight blades will perform with definite results, the type shown is believed to be more efficient, because it fits more nearly that portion of the inside contour of the said casing C it occupies.

Adjacent said fan 30, but spaced slightly therefrom so as to permit the free rotation of said fan, is a closure plate 35 which, by means of openings, serves to guide the direction of the air to and from the fan, which plate is held to said side 24 by screws 36. This plate 35 has an outlet or opening 38 therein at one side for the escape of air from the said fan 30 and also has an air inlet opening 39 at the center through which air is drawn to supply said fan. There is also preferably a groove 40, providing an air passage, formed in said closure plate 35 in which the air passes freely around to said escape opening 38. This groove 40 permits a freer flow of air than if it were not there. Said shaft 16 passes through said opening 39 in said closure plate 35 as shown. Should a centrifugal fan with straight blades be used only the air inlet opening 39 in said closure plate would be necessary.

Within said casing C is a cylinder or interior housing 45 in which a vane 54, later described, is moved in a passage 53 therein by the pressure of air from said fan. Said housing 45 is fastened to said closure plate 35 by screws 46 and is also fastened to said base 23 by screws 47, and it has an extension member 48.

Leading from said air outlet opening 38 is an air passage 50 formed in a thickened portion of said interior housing 45. A dividing plate or wall 51, preferably wedge-shaped from front end to rear end as shown in Figure 12 of the drawings, fits in said housing 45 extending across said housing passage 53. Said wall 51 has a channel 52 in its upper portion thereof extending through its outside end through which the air passes from said passage 50 into said housing passage 53 and proceeds towards a movable vane 54. Said vane 54 has a hub 55 fixed on a rotable shaft 56 one end of which shaft rotatably sets in a plate 58 set in said housing 45, and the other end rotatably sets in an adjustable screw 57 outside said housing, later described. It is the continuous air pressure created by said fan 30 while it is being rotated by said shaft 16 which moves said vane 54 in said housing 45 to thereby indicate in a manner, later described, the revolving speed of the shaft or member S which my device is operatively connected to.

In said interior housing 45 is a slit 59 (see Figures 5 and 8) which leads into a peripheral channel 60 which is formed by means of a U-shaped segment member 61 inserted in an opening formed in the periphery of said housing 45. This channel 60 and slit 59 preferably commence somewhat forward of the starting point or normal position of said vane 54 shown in Figure 3 of the drawings, and continue around said housing 45 to a return air passage 63 later described. After said vane 54 has moved forward to some extent in said housing passage 53 some of the air pressing upon it will escape through said slit 59 into said channel 60 thereby weakening somewhat the air pressure behind said vane. This has been found to be desirable in order to have said vane 54 by even movements accurately indicate the speed of revolution on a marked dial 85, later described, of the shaft S being tested. Each device must be tested for accuracy before being used and the size of said slit 59, and if necessary of said channel 60, may be varied somewhat as required.

Said dividing wall 51 has another channel 62 in its lower portion extending through its outside end, similar to but spaced from said channel 52 through which air from said housing passage 53 escapes into a return air passage 63. Said passage 63 is formed in said interior housing 45 and connects with the upwardly extending passage or opening 39 in said closure plate 35, so that the air returns to said fan 30 at approximately the center thereof, from where it is again forced out to said vane 54 as above described. In order to vary the size of said return air passage 63 and thereby control the volume of air passing through it to the fan, a screw 64 extends through said housing 45 into said passage 63 thereby reducing the size of said passage, the extent of said reduction depending to what position the screw is moved to, which is determined when my device is tested for accuracy during the process of manufacture.

Said housing 45 has a cover 67 which rests on said dividing wall 51 and said housing 45, and has an opening to permit said vane shaft 56 to extend therethrough.

To indicate the number of revolutions per minute of the revolving shaft S being tested I provide an indicator I as part of my device, which has a pointer 70, fixed to a hub 71 in which hub said vane shaft 56 makes a press fit so that said pointer 70 moves with said vane 54. A screw 72 extends into the lower end of said pointer 70 and serves as a balancer thereof. There is a spacer 73 between said hub 71 and a coiled hair spring 74, both said spacer and spring being pressed onto said vane shaft 56 to make a press fit. Said spring 74 insures the automatic return of said pointer towards or to starting position when the pressure of air on said vane is reduced or ceases altogether.

A supporting arm 77 extends from said housing extension member 48, being held thereto by a screw 78. A retaining arm 80 rests on said arm 77 and extends downwardly to said spring 74 and is attached to one end thereof. In order to set said pointer 70 to its correct position this retaining arm 80 is moved the distance required to do this. An interiorly screw threaded hub 82 extends through openings in said arms 77 and 80 to which said screw 57 screw-threadedly connects and extends therethrough as shown. A lock nut 83 screws on the outside of said screw 57 and locks the parts in their correct position. When said pointer 70 is correctly set this nut 83 is tightened and thereby holds it in position.

An indicator dial or marked face 85 rests on said extension member 48 and on said supporting arm 77 and on said side 24 as shown in Figure 6 of the drawings, being held thereto by screws 86 extending into said side 24 and said extending member 48. A crystal 91 covers said dial 85, being set in said cover 25.

In determining the speed of rotation of a shaft S which commonly has a base or center 100 at the end, a sleeve 101, having a slit 102 therein, fits over said shaft 16 and extends beyond as shown in Figure 2 of the drawings. Over one end of said sleeve 101 a rubber cone 103 is fitted, the pointed end of which enters said center 100 thereby providing a friction grip whereby said shaft 16 of my device is rotated at the same speed as shaft S. This operative connection between said shafts 16 and S may be made by other well known means if desired.

When this operative connection is made, the rotation of shaft 16 rotates the blades 31 of said fan 30, discharging the air from said fan through said opening 38, thence into said air passage 50 and into said opening 52 formed in the upper portion of said wall 51 and thence into said housing passage 53 towards said vane 54. The degree of pressure of the air moving said vane in said passage 53 determines in some measure the extent of the movement of said vane, the greater the air pressure the greater the said movement. This pressure varies, of course, with the speed of rotation of said shaft S and the said shaft 16. To some extent the suction caused by the said fan 30 in drawing air from said housing passage 53 helps to move said vane 54. Provision is made for some leakage of the air moving towards said vane by means of said slit 59 and channel 60 through which it escapes. The purpose of this is to have the said vane, together with said indicator pointer 70, move an equal distance at all points on said dial 85 in response to a certain increase in the number of revolutions of said shafts S and 16. In other words, if a movement of ⅛ inch of the said pointer 70 indicates an increase in speed of 100 revolutions at one point, then all movements of ⅛ inch likewise represent a change of speed of 100 revolutions.

The air passes from said housing passage 53 through said wall opening 62 into said air passage 63 which is slightly curved and slants upwardly, and thence through said closure plate opening 39 to said fan. The air escaping through said housing slit 59 into said channel 60 passes out of the end of said channel directly into said air passage 63 at a different point than the air passing through said wall opening 62, as illustrated in Figure 5 of the drawings.

What I claim is:

1. A speed indicating device comprising a casing, a movable shaft extending into said casing, a fan within said casing connected to said shaft and movable therewith, a closure plate for said fan spaced slightly therefrom having two openings therein to permit the escape of air from said fan and to permit the entrance of air to said fan, a housing in said casing having passages therein communicating with said closure plate openings and having a circular interior passage in communication therewith, a dividing wall in said housing interior passage having openings therein to permit the passage of air therethrough, a movable vane in said interior passage positioned so as to be in the path of the air escaping from said fan through a said housing passage, and indicating means connected to and movable with said vane.

2. A speed indicating device comprising a casing, a movable shaft extending into said casing, a fan within said casing connected to said shaft and movable therewith, a closure plate for said fan spaced slightly therefrom having openings to permit the escape of air from said fan and to permit the entrance of air to said fan, a housing within said casing having portions forming passages in communication with said openings to permit air to pass therethrough to and from said fan and having portions forming a passage in its interior for the circulation of air therein, a movable vane in said latter housing interior passage, a wall to the rear of the normal position of said vane extending across said housing interior passage, and indicating means connected to and movable with said vane.

3. A speed indicating device comprising a casing, a movable shaft extending into said casing, a fan within said casing connected to said shaft and movable therewith, a closure plate for said fan having two openings therein to permit the escape of air from said fan and to permit the entrance of air to said fan, a housing within said casing having openings in communication with said closure plate openings, and having a passage in its interior in communication with said housing openings to permit the passage of air, a movable vane within said housing interior passage positioned so as to be within the path of the air escaping from said fan through a said closure plate opening, a wall in said housing to the rear of the normal position of said vane, said wall having an opening therein at the outer end to permit the escape of air therethrough from said fan to said vane and another opening therein at said outer end to permit the escape of air from said housing to said fan, and indicating means having a pointer connected to and movable with said vane.

4. A speed indicating device comprising a casing, a movable shaft extending into said casing, a fan within said casing connected to said shaft and movable therewith, a housing within said casing having passages to permit the passage of air to and from said fan, a movable vane within said housing positioned so as to be in the path of the air escaping from said fan, a wall in said housing to the rear of the normal position of said vane, said wall having an opening in the upper portion thereof to permit the escape of air therethrough from said fan to said vane and an opening in the lower portion thereof to permit the escape of air from said housing to said fan, and indicating means connected to and movable with said vane.

5. A speed indicating device comprising a casing, a movable shaft, a fan within said casing connected to said shaft and movable therewith, a closure plate for said fan having two openings therein to permit the escape of air from said fan and to permit the entrance of air to said fan, a housing in said casing having a portion forming an air passage in communication with said closure plate air escape opening and having another portion forming an air passage in communication with said closure plate air entrance opening, said housing having an interior passage for the circulation of air in communication with said passages, a wall in said interior passage having two channels spaced apart at the outer end thereof each channel being in communication with a said passage formed in said housing, a movable vane in said housing interior passage, and indicating means connected to and movable with said vane.

6. A speed indicating device comprising a casing, a movable shaft, a fan within said casing connected to said shaft and movable therewith, a closure plate for said fan having two openings therein to permit the escape of air from said fan and to permit the entrance of air to said fan, a housing in said casing having a portion forming an air passage in communication with said closure plate air escape opening and having another portion forming an air passage in communication with said closure plate air entrance opening, said housing having an interior passage for the circulation of air in communication with said housing air passages, a wall in said interior passage the outer end of which is opposite said two air passages formed by said housing portions, said wall having two channels spaced apart in the upper and lower portions extending through said outer end, a movable vane in said housing interior passage, and indicating means connected to and movable with said vane.

7. A speed indicating device comprising a casing, a rotatable shaft extending into said casing, a centrifugal fan within said casing mounted to said shaft and movable therewith, a closure plate in said casing for said fan spaced slightly therefrom, said closure plate having an opening at the center thereof to permit the entrance of air to said fan and having an opening at the side thereof to permit the escape of air from said fan, a housing in said casing having a portion forming an air passage in alinement with said closure plate escape opening and having a portion forming an air passage in alinement with said air entrance opening, said housing having an interior, circular passage formed therein, a wall in said interior passage, said wall having a channel in the upper portion thereof at the outside end thereof in alinement with the first-mentioned housing air passage and extending into said interior passage and having another channel spaced from the first-mentioned channel in the lower portion thereof at said outside end in alinement with the second-mentioned housing air passage and extending into said interior passage, a movable vane extending into said interior passage in said housing having a hub at the center of said housing, a vertical shaft rotatably connected to said hub, and indicating means having a pointer connected to and rotatably movable with said hub shaft.

8. A speed indicating device comprising a casing, a rotatable shaft extending into said casing, a centrifugal fan within said casing mounted to said shaft and movable therewith, a closure plate in said casing for said fan spaced slightly therefrom, said closure plate having an opening at the center thereof to permit the entrance of air to said fan and having an opening at the side thereof to permit the escape of air from said fan, said closure plate having a channel sunk therein in its outer portion in communication with said air escape opening, a housing in said casing having a portion forming an air passage in alinement with said closure plate escape opening and having a portion forming an air passage in communication with said air entrance opening, said housing having an interior, circular passage formed therein, a wall extending across said interior passage, a movable vane extending into said interior passage in said housing having a hub at the center of said housing, a shaft rotatably connected to said hub, and indicating means connected to and rotatably movable with said hub shaft.

9. A speed indicating device comprising a casing, a rotatable shaft extending into said casing, a centrifugal fan within said casing mounted to said shaft and movable therewith, a closure plate in said casing for said fan spaced slightly therefrom, said closure plate having an opening at the center thereof to permit the entrance of air to said fan and having an opening at the side thereof to permit the escape of air from said fan, a housing in said casing having a portion forming an air passage in alinement with said closure plate escape opening and having a portion forming an air passage in alinement with said air entrance opening, said housing having an interior, circular passage formed therein, a wall extending across said interior passage, a movable vane extending into said interior passage in said housing having a hub at the center of said housing, a shaft rotatably connected to said hub, and indicating means connected to and rotatably movable with said hub shaft said wall extending to a point adjacent the periphery of said hub.

10. A speed indicating device comprising a casing, a rotatable shaft extending into said casing, a fan within said casing mounted to said shaft and movable therewith, a closure plate for said fan, a housing in said casing, a movable vane in said housing, and indicating means connected to and movable with said vane, said closure plate having an opening, said housing having a single entrance passage in communication with said opening, said housing having an interior passage in alinement with the said single entrance passage, said vane being in said interior passage in the path of the air passing from said fan, said closure plate having another opening spaced from the first-mentioned closure plate opening, said housing having another single escape passage in communication with said closure plate other opening and with said housing interior passage, and a wall extending across said interior passage.

11. A speed indicating device comprising a casing, a rotatable shaft extending into said casing, a fan within said casing mounted to said shaft and movable therewith, a closure plate for said fan, a housing in said casing, a movable vane in said housing, and indicating means connected to and movable with said vane, said closure plate having an opening, said housing having a passage in alinement with said opening, said housing having an interior passage in alinement with the first-mentioned passage, said vane being in said interior passage in the path of the air passing through said openings from said fan, said closure plate having another opening spaced from the first-mentioned closure plate opening, said housing having another passage in alinement with said closure plate other opening and with said housing interior passage, and a wall extending across and dividing said interior passage, said housing having a slit intermediate the top and bottom extending from said interior passage, and having a channel in the outer portion thereof connecting with said slit and extending part way around said housing and connecting with said housing other passage.

12. A speed indicating device comprising a casing, a rotatable shaft extending into said casing, a fan within said casing mounted to said shaft and movable therewith, a closure plate for said fan, a housing in said casing, a movable vane in said housing, and indicating means connected to and movable with said vane, said closure plate having an opening, said housing having a passage in alinement with said opening, said housing having an interior passage in alinement with the first-mentioned passage, said vane being in said interior passage in the path of the air passing through said openings from said fan, said closure plate having another opening spaced from the first-mentioned closure plate opening, said housing having another passage in alinement with said closure plate other opening and with said housing interior passage, and a wall extending across and dividing said interior passage, said housing having a slit intermediate the top and bottom extending from said interior passage, and having a channel in the outer portion thereof connecting with said slit and extending part way around said housing and connecting with said housing other passage, said slit and housing channel starting at a point forward of the normal position of said vane and ending at said housing other passage.

JOHN J. MacDOUGALL.